Aug. 29, 1933.     W. F. SCHACHT     1,925,008
SINK STOPPLE
Filed Feb. 11, 1933
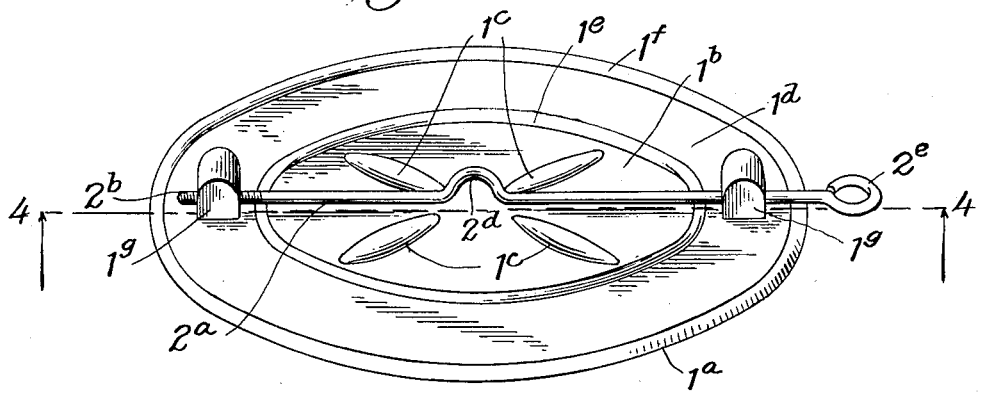
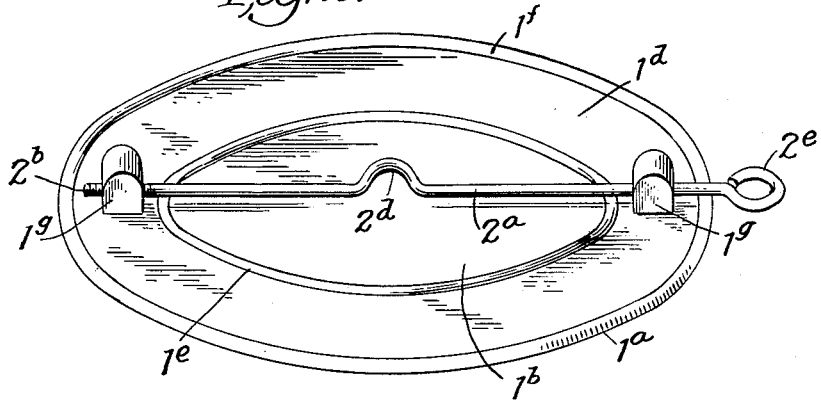
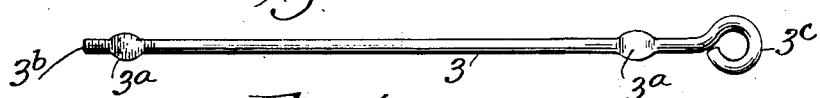
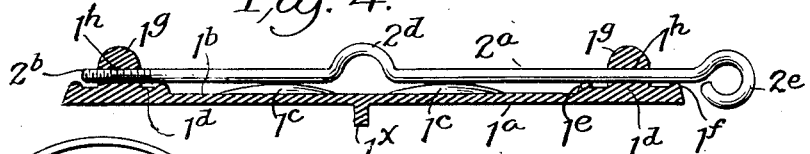
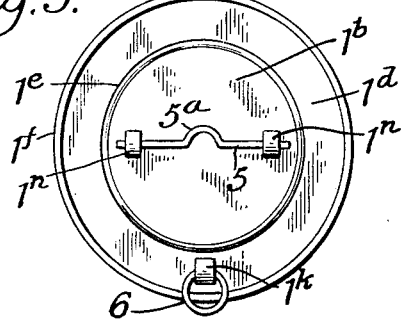
Inventor
William F. Schacht
By
Alexander Bell
Attorney Patented Aug. 29, 1933

1,925,008

UNITED STATES PATENT OFFICE 1,925,008

SINK STOPPLE

William F. Schacht, Huntington, Ind.

Application February 11, 1933. Serial No. 656,322

7 Claims. (Cl. 4—293)

This invention is a novel improvement in sink stopples such as shown in my U. S. Letters Patent No. 1,646,112, dated October 18, 1927, and in my copending application Serial No. 605,328, filed April 14, 1932, said stopples being designed for use primarily in ordinary kitchen sinks or the like in which the outlet of the sink is provided merely with a strainer plate and has per se no means for closing the outlet. The stopples in my said patent and application consist briefly of a thin flexible body of soft rubber, having a thick wide flat rim portion to prevent curling and to prevent seepage of liquid past the stopple, a centrally disposed handle, and a knob upon the thickened rim portion whereby when it is desired to release the stopple the edge may be raised to break the suction under the stopple.

The principal objects of my present invention are to provide pairs of lugs on the upper face of such stopples through which wire rods are passed to form handles, said rods having loops extending beyond the peripheries of the stopples. The rods stiffen the stopples and prevent same from warping. By raising the loops at the ends of the rods the suction under the stopples is broken. When the stopples are placed in sinks the rods however do not affect the suction on the undersides of the stopples.

A further object is to provide radially disposed thickened beads or ribs on the thin flexible central portions of the stopples, the ribs assisting in keeping the stopple from warping, and assist in maintaining the suction.

I will explain the invention with reference to the accompanying drawing which illustrates several practical embodiments thereof to enable others to adopt and use the same; and will summarize in the claims the essential features of the invention, and the novel combinations of parts, for which protection is desired.

In said drawing:—

Fig. 1 is a perspective view of one form of stopple.

Fig. 2 is a perspective view of a modified form.

Fig. 3 shows a modified form of rod, detached.

Fig. 4 is a section on the line 4—4, Fig. 1.

Fig. 5 is a plan view of further modified stopple.

The stopple illustrated in Figs. 1-4 briefly comprises a thin disk-like body portion of flexible material, preferably of soft molded rubber, adapted to readily conform with the contour of the surface upon which the stopple is placed. The lower face 1a of the stopple is flat, and the stopple is of such size as to directly overlie the usual outlet strainer (not shown) of a sink. In the upper face of the stopple is molded a central circular recess 1b, making the central portion of the stopple much thinner than the rim portion. If desired a plurality of radially disposed thickened ribs 1c may be provided within the recess 1b, said ribs being preferably molded integral with the body and adapted to prevent warping of the thin recessed portion 1b.

The thick rim portions 1d of the stopple prevent the edges from curling, thereby insuring that the stopples will effectively seal the drain. The thick rim portions 1d furthermore strengthen the peripheries of the stopples, and may be provided with inner and outer annular beads 1e, 1f, on their upper surfaces.

Molded upon the rim 1d are diametrically opposed lugs 1g having aligned bores 1h (Fig. 4) adapted to receive a horizontally disposed rod 2a, preferably of metal such as stiff wire. Rod 2a extends diametrically of the stopple and passes through one lug 1g and has a threaded end 2b tapped into the other lug 1g. At the center of the wire 2a is an offset semi-circular portion 2d; and at one end of rod 2a is an eye or loop 2e projecting beyond the periphery of the stopple whereby the edge of the stopple may be raised to break the suction; also the stopple may be readily hung up by loop 2e when not in use. The rod 2a forms a convenient handle for the stopple, and if desired a chain or cord (not shown) may be attached to the offset portion 2d of the rod. The molded lugs 1g may be reinforced with fabric or canvas. If desired a lug or projection 1x (Fig. 4) may be formed on the bottom of the stopple adapted to enter a hole of the sink strainer plate to prevent the stopple from slipping.

In Fig. 2 a modified form of stopple is shown which is substantially identical with that shown in Figs. 1 and 4 except that the radially disposed thickened ribs, shown at 1c in Fig. 1, are omitted. The rod 2a is likewise the same as that in Figs. 1 and 4.

In Fig. 3 a rod or stiffener wire 3 is shown similar to wire 2a of Fig. 1, except that the rod has portions 3a which are thickened or flattened where they pass through the lugs 1g to prevent the rod from rotating in the lugs. One end of rod 3 is threaded as at 3b, and the other end has a loop 3c corresponding with the loop 2e of the rod in Fig. 1. Rod 3, as shown, has no central semi-circular offset portion such as provided in rods 2a, but if desired same may be so provided.

Fig. 5 shows a further modification in which lugs 1n (similar to lugs 1g of Fig. 1) are formed on the thin central portion 1b of the sink stopple instead of on the thickened rim portion 1d. Between the lugs 1h extends a stiffening wire or rod 5 having a central semi-circular offset portion 5a, which corresponds with the portion 2d of wire 2a. In this form the thickened rim portion 1d has an integral lug 1k through which a ring 6 is inserted by which the stopple may be hung up, or by which the rim of the stopple may be raised.

The radially disposed thickened rubber ribs 1c of Fig. 1 largely prevent the central portion 1b of the stopple from warping; and by making the central portion of the stopple thin and the rim portion heavy, a greater suction is created to hold the stopple in place.

When the stopple is placed in the sink it is almost impossible to pull same away from the sink by lifting the central portions of the rods, but when it is desired to remove or release the stopple from the sink the rim 1d may be readily raised by lifting the loops 2e or 3c, thereby breaking the suction under the stopple. The stopple thus molded is effective, strong, and flexible, and will form a water tight closure over the sink strainer or drain.

I claim:—

1. A stopple comprising a thin flexible disk having a flat lower face and a thickened rim; diametrically disposed lugs on the disk; and a rod extending through the said lugs to form a handle, said rod having means for raising the rim to break the suction thereunder when it is desired to release the stopple.

2. In a stopple as set forth in claim 1, a substantially semi-circular offset portion in the rod at the center of the stopple.

3. A stopple comprising a thin flexible disk having a flat lower face and a thickened rim; lugs on the rim; a rod extending through said lugs to form a handle; said rod having means for raising the rim to break the suction thereunder when it is desired to release the stopple.

4. In a stopple as set forth in claim 3, the rod extending beyond the periphery of the stopple, and said means comprising a loop in the projecting end of the rod.

5. In a stopple as set forth in claim 3, the portions of the wire passing through the lugs being flattened.

6. In a stopple as set forth in claim 3, a substantially semi-circular offset portion in the rod at the center of the stopple.

7. In a stopple as set forth in claim 3, the rod extending beyond the periphery of the stopple, and said means comprising a loop in the projecting end of the rod, and a substantially semi-circular offset portion in the rod at the center of the stopple.

WILLIAM F. SCHACHT.